(12) United States Patent
Roadley-Battin

(10) Patent No.: US 12,463,420 B2
(45) Date of Patent: Nov. 4, 2025

(54) WEIGHTED SETPOINT FOR ACTIVE RECTIFIER STABILITY

(71) Applicant: Hamilton Sundstrand Corporation, Charlotte, NC (US)

(72) Inventor: Jonathan Roadley-Battin, Birmingham (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/603,654

(22) Filed: Mar. 13, 2024

(65) Prior Publication Data

US 2024/0313529 A1 Sep. 19, 2024

(30) Foreign Application Priority Data

Mar. 13, 2023 (EP) .................................. 23275041

(51) Int. Cl.
*B64D 47/00* (2006.01)
*H02J 1/08* (2006.01)

(52) U.S. Cl.
CPC ................ *H02J 1/08* (2013.01); *B64D 47/00* (2013.01); *B64D 2221/00* (2013.01)

(58) Field of Classification Search
CPC ....... H02J 1/08; B64D 47/00; B64D 2221/00; H02M 1/0025; H02M 1/007; H02M 1/009; H02M 7/217; H02M 1/008
USPC .............. 307/9.1, 18, 66, 43, 64, 82, 84, 31; 322/28; 363/37
See application file for complete search history.

(56) References Cited

U.S. PATENT DOCUMENTS

| | | | |
|---|---|---|---|
| 7,952,896 B2 | 5/2011 | Hu et al. | |
| 9,293,985 B2 | 3/2016 | Nguyen | |
| 9,586,690 B2 | 3/2017 | Rajashekara et al. | |
| 10,589,635 B1 | 3/2020 | Solodovnik et al. | |
| 2008/0211237 A1* | 9/2008 | Berenger .................. | H02J 3/12 290/40 B |

(Continued)

FOREIGN PATENT DOCUMENTS

| | | |
|---|---|---|
| DE | 102020117180 A1 | 12/2021 |
| DE | 102020120530 A1 | 2/2022 |

(Continued)

OTHER PUBLICATIONS

European Search Report for Application No. 23275041.4, mailed Aug. 24, 2023, 8 pages.

(Continued)

*Primary Examiner* — Elim Ortiz
(74) *Attorney, Agent, or Firm* — CANTOR COLBURN LLP

(57) ABSTRACT

An active rectifier circuit for providing a rectified voltage output to a point of regulation that is located downstream of the active rectifier circuit. The active rectifier circuit includes rectifying circuitry and control circuitry operable to control the rectifying circuitry based on voltage feedback to provide a certain voltage output at the point of regulation. The control circuitry is configured to obtain voltage feedback from a first point associated with the point of regulation and to obtain parallel voltage feedback from a second, different point, and to control the rectifying circuitry based on both the voltage feedback from the first point and the voltage feedback from the second point.

14 Claims, 5 Drawing Sheets

(56) References Cited

U.S. PATENT DOCUMENTS

| | | | |
|---|---|---|---|
| 2020/0083717 A1* | 3/2020 | Pouliquen | H02J 4/00 |
| 2021/0313913 A1* | 10/2021 | Michaud | H02P 9/10 |
| 2022/0166335 A1 | 5/2022 | Mnson et al. | |
| 2022/0261022 A1 | 8/2022 | Dasgupta et al. | |

FOREIGN PATENT DOCUMENTS

| | | | | |
|---|---|---|---|---|
| DE | 102020126471 A1 | 4/2022 | | |
| LU | 102123 B1 | 4/2022 | | |
| WO | WO-2009153675 A2 * | 12/2009 | | H02M 1/4258 |
| WO | WO-2016172684 A1 * | 10/2016 | | |

OTHER PUBLICATIONS

European Official Letter for Application No. 23275041.4, mailed Jul. 31, 2025, 8 pages.

* cited by examiner

WEIGHTED SETPOINT FOR ACTIVE RECTIFIER STABILITY

CROSS REFERENCE TO RELATED APPLICATIONS

This application claims priority to European Patent Application No. 23275041.4 filed Mar. 13, 2023, the entire contents of which is incorporated herein by reference.

TECHNICAL FIELD

The technology described herein relates generally to the operation of electrical apparatus and in particular to active rectification circuitry. In embodiments the technology described herein relates to an electrical distribution system for an aircraft.

BACKGROUND

In the aerospace industry, there is currently a trend towards more electric aircraft whereby loads, such as flight control surfaces, landing gear, actuators, fans, pumps, etc., which have traditionally been controlled by hydraulic and mechanical systems are now being designed to be controlled electrically by means of an electric motor. For example, newer generations of high lift systems are envisaged to be highly flexible, distributed and actively controlled using electro mechanical actuators that are driven by an electric motor drive system. In such cases, an electric motor may be coupled to the aircraft engine and operable to take off power from the engine shaft, in a generative operation (the electric motor may also be operable to inject power onto the engine shaft, either as a starter circuit, or in-flight as part of a hybrid electric propulsion systems). The electric motor may thus be operated as an alternating current (AC) generator. The aircraft electrical distribution system uses direct current (DC) and so rectification is employed in order to convert the alternating current (AC) that is generated from the aircraft engine (or other suitable generator, depending on the system in question) into direct current (DC) suitable for distribution to the desired loads.

Active rectification is typically used to improve the efficiency of the rectification, in which diodes are replaced with actively controlled switches (e.g. transistors), with the switches being controlled based on some voltage feedback. For example, FIG. 1 shows an example of a traditional direct current (DC) distribution scheme 1 that may be employed within a hybrid electric aircraft. In this example, the source 10 is a three-phase generator which may be driven directly by the aircraft engine, as described above. Active rectification 11 is then employed within the distribution bus 1 as shown in order to regulate the voltage that is applied to the one or more loads 13 on the right hand side of FIG. 1. As shown in FIG. 1, the active rectifier 11 takes as an input voltage feedback 14 from a "point of regulation" 12 associated with the loads. This is then compared with the demanded voltage that is desired to be provided at that point, and the active rectification is controlled accordingly on this basis to try to maintain the desired output voltage.

The "point of regulation" is thus the point at which the system tries to maintain a certain voltage, e.g. according to voltage demand. For example, and typically, the point of regulation is associated with the harness or bus bar connection where the different loads are connected in common.

Similar electrical distribution schemes may of course be used for various other, non-aerospace applications, including national power grids, etc., where again active rectification may be employed in order to provide smoother output based on point of regulation feedback.

The Applicants however believe there remains scope for improved active rectification circuitry.

SUMMARY

A first aspect of the technology described herein comprises an active rectifier circuit for providing a rectified voltage output to a point of regulation that is located downstream of the active rectifier circuit, the active rectifier circuit comprising rectifying circuitry and control circuitry operable to control the rectifying circuitry based on voltage feedback to provide a certain voltage output at the point of regulation, wherein the control circuitry is configured to obtain voltage feedback from a first point associated with the point of regulation and to obtain parallel voltage feedback from a second, different point that is generally upstream of the point of regulation, e.g., and in embodiments, the second point is associated with the rectifying circuitry, and to control the rectifying circuitry based on both the voltage feedback from the first point and the voltage feedback from the second point.

A second aspect of the technology described herein comprises a method of operating an active rectifier circuit to provide a rectified voltage output to a point of regulation that is located downstream of the active rectifier circuit, the active rectifier circuit comprising rectifying circuitry and control circuitry operable to control the rectifying circuitry based on voltage feedback to provide a certain voltage output at the point of regulation, the method comprising obtaining by the control circuitry voltage feedback from a first point associated with the point of regulation and obtaining by the control circuitry parallel voltage feedback from a second, different point that is generally upstream of the point of regulation, e.g., and in embodiments, the second point is associated with the rectifying circuitry, and controlling the rectifying circuitry based on both the voltage feedback from the first point and the voltage feedback from the second point.

The above arrangements relate to an improved active rectification technique wherein voltage feedback is obtained not only from the point of regulation (as may typically be the case, e.g. in more conventional electrical distribution systems) but is also obtained from a second, different point that is associated with the active rectifier circuit itself. This means that the active rectifier is able to more quickly react to disturbances associated with the active rectifier circuit, or the generator source, and provide feedback control based on such disturbances, without having to wait for the disturbances to propagate to the point of regulation. In this respect, the Applicants recognise that there may in practice be a significant distance between the active rectifying circuitry and the point of regulation. The technology described herein can therefore provide a smoother control, that is especially well-suited to electrical distribution systems associated with relatively noisier generator sources.

The technology described herein may therefore provide various benefits compared to other more conventional approaches.

Subject to the requirements of the technology described herein, the active rectifying circuit may comprise any suitable and desired rectification circuitry. Thus, the active rectifying circuit may in general comprise any circuitry and components that an active rectifier may suitably contain. For example, in addition to the active rectification circuitry itself, and the associated control (feedback) circuitry, the active rectifying circuit may further comprise various suitable filtering stages, etc., as desired.

According to the technology described herein, the rectifying circuit is thus controlled based on voltage feedback. In particular, the obtained voltage feedback is in embodiments compared to a demanded voltage, e.g. a desired voltage for the point of regulation, and the control is then performed based on the difference between the obtained voltage feedback and the demanded voltage in order to try to maintain a certain (e.g. the demanded) voltage at the point of regulation. In the technology described herein, voltage feedback is additionally obtained from a second point that is associated with the active rectifier circuit, and is hence significantly upstream of the point of regulation.

Thus, in embodiments, the voltage feedback from the first point and the voltage feedback from the second point are used together to control the rectifying circuitry, wherein the control is performed using a weighted combination of the voltage feedback from the first point and the voltage feedback from the second point.

In embodiments, the voltage feedback from the first point and the voltage feedback from the second point may be combined according to a certain, e.g. pre-determined, e.g. static, weighting. For example, the weighting may be determined in advance, e.g. by suitable pre-characterisation of the system. The present Applicants however recognise that it would also be possible to dynamically adjust the weighting of the respective voltage feedbacks according to one or more other conditions to provide a finer-grained control. Thus, in some embodiments, the weighted combination of the voltage feedback from the first point and the voltage feedback from the second point can be dynamically adjusted according to one or more other conditions.

Various arrangements are contemplated in this regard. For instance, the active rectifier control circuitry may also take additional inputs which can be used in this regard. For instance, in an aircraft application, the active rectifier control circuitry may receive inputs indicative of the current engine operating stage which can then be used to determine the appropriate weighting, e.g. from a set of available weightings. So, during noisy operating conditions, it may be desired to increase the contribution from the voltage feedback from the second point, as such source variations may be expected to have a more significant impact. Similarly, inputs may be received indicative of one or more operating conditions such as a temperature, engine speed, and so on, that might be expected to impact the noise that is associated with the generator source. Generally, the other conditions may be any suitable and desired conditions relating to the system in question.

The voltage feedback may be combined in any suitable and desired manner, e.g. depending on the arrangement of the active rectifier circuit.

For instance, in embodiments, the voltages obtained from the first and second point may be directly combined according to a certain weighted sum, with the combined (weighted) value then used as input which is then otherwise processed in the normal manner for voltage feedback. Thus, in embodiments, the voltage feedback from the first point and the voltage feedback from the second point are combined according to a weighted sum, which weighted sum is then compared to a demanded voltage output to generate an error signal, which error signal is then used to control the rectifying circuitry.

It is also contemplated however that the voltages obtained from the first and second point may be further processed before they are combined. For example, in another embodiment, the voltage feedback from the first point is compared to a demanded voltage output to generate a first error signal, and wherein the voltage feedback from the second point is compared to the demanded voltage output to generate a second error signal, and wherein the error signals are then combined according to a weighted sum, which weighted sum is then used to control the rectifying circuitry.

Various other arrangements would be possible in this regard.

As mentioned above, the first point from which voltage feedback is obtained is associated with a point of regulation. As will be understood, the "point of regulation" is the the point at which the system tries to maintain a certain voltage, e.g. according to voltage demand. Thus, the point of regulation (the first point) should be (and is) located downstream of the active rectification circuitry, between the active rectifier and one or more loads that are connected to the electrical distribution system. In embodiments, the point of regulation may be a common point of regulation for a group of plural loads. The point of regulation (the first point) may thus be associated with a harness or bus bar connection where plural different loads are connected in common.

The second point from which voltage feedback is obtained is generally upstream of the point of regulation, e.g., and in embodiments, it is associated with the rectifier circuit itself. For example, the second point may be located along a bus that is internal to the active rectifier, e.g., and in embodiments, downstream (e.g. immediately downstream) of the rectifying (i.e. switching) circuitry of the active rectifier. In embodiments, it may be obtained after the rectifying (i.e. switching) circuitry of the active rectifier, but prior to the final, e.g. filtered, output from the active rectifier. The effect of this is therefore that the second point from which voltage feedback is obtained is generally located relatively closer to the generator source. The second point thus not only reflects disturbances in active rectifier itself but also reflects earlier disturbances in the source. Obtaining voltage feedback from two places thus allows more accurate control, as the active rectifier can be controlled using point of regulation feedback as normal, and the additional contribution from the second point allows disturbances closer to the generator source to be mitigated earlier. For example, the first point is in embodiments at least 10 metres away from the second point.

It is often the case that the active rectifier circuit may already monitor voltage feedback associated with the rectifying circuit for safety monitoring purposes. In that case, in some embodiments, it is contemplated that this voltage may also be used for the control purposes described above. That is, in embodiments, the voltage feedback from the second point is also usable (and used) for safety monitoring of the active rectifier circuit. However, in many applications where higher levels of functional safety are dictated, the control operation may need to be separated from any safety monitoring. In that case, voltage feedback may also be obtained from a third point for use in safety monitoring of the active rectifier circuit, wherein the voltage feedback from the first and second points that is used for control of the active rectifier circuit is separate from the voltage feedback from the third point that is used for safety monitoring.

In some embodiments the active rectifying circuit may be used as part of an aircraft electrical distribution system. Thus, according to a further aspect, there is provided an aircraft electrical distribution system comprising a generator, an active rectifier circuit substantially as described herein according to any embodiments of the technology described herein, an electrical distribution bus for distributing the rectified voltage output from the active rectifier circuit to one or more loads, and wherein the point of regulation is positioned on the electrical distribution bus upstream of the one or more loads.

The technology described herein may be particularly beneficial in the context of aircraft electrical distribution systems, in particular where the generator is directly coupled to the aircraft engine, and therefore subject to relatively higher noise, particularly during certain flight stages. However, in general, the active rectifying circuits described herein may be used in any suitable electrical distribution system, as desired, where it is desired to provide improved active rectification.

BRIEF DECRYPTION OF THE DRAWINGS

A number of embodiments and examples will now be described to illustrate the technology described herein with reference to the following figures in which.

Like reference numerals are used for like components where appropriate in the Figures.

DESCRIPTION

The technology described herein generally relates to active rectification. Active rectification, or synchronous rectification, is a technique for improving the efficiency of rectification by replacing diodes with actively controlled switches, typically power MOSFETs or power bipolar junction transistors (BJTs), but various arrangements are possible, including, but not limited, IGBTs, thyristors, SiCFETs, GTOs, JFETs, and the like. With high voltage direct current distributions being considered more and more within aerospace applications, active rectification is increasingly employed to manage the electrical distribution bus. Thus, various embodiments will now be described in the context of an aircraft electrical distribution system. However, it will be appreciated that the technology described herein is not generally limited to aerospace applications and may be used in any suitable and desired system.

Figure 1:
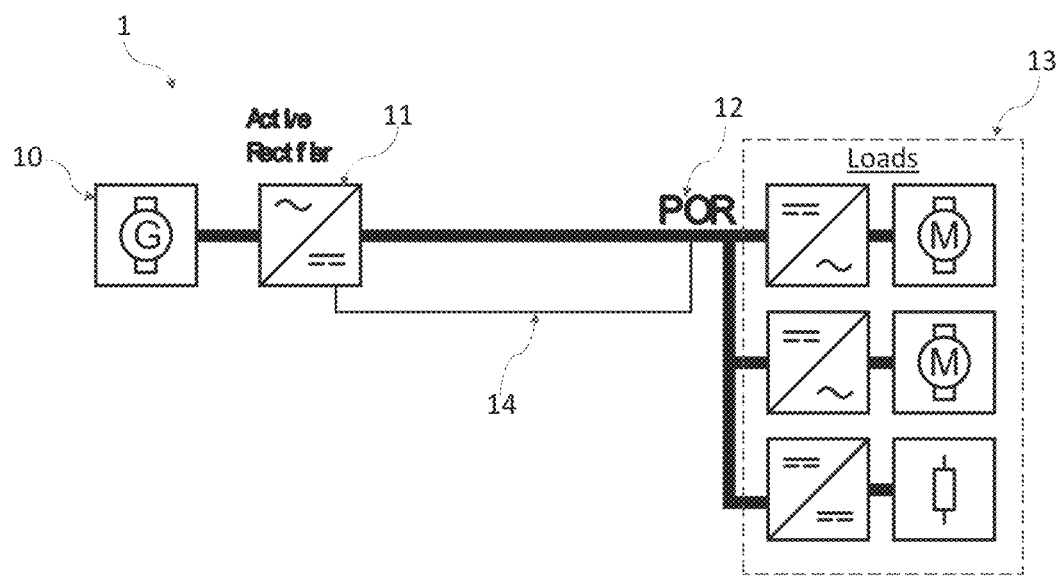
FIG. 1 shows a schematic of a more conventional active rectifier circuit.

FIG. 1 shows schematically a more traditional active rectifier circuit 1, in which, as mentioned above, voltage feedback is obtained from a point of regulation 12, which voltage feedback is then compared with the desired (e.g. demanded) voltage at the point of regulation, resulting in an error signal, and the resulting error signal is used to control the active rectifier 11 in order to try to maintain the desired (e.g. demanded) voltage at the point of regulation. The active rectifier 11 may however often be located a significant distance away from the loads, and hence the point of regulation. For example, in the case of an electrical distribution system within an aircraft, in which one or more auxiliary loads are powered by taking power off from the aircraft engine, the aircraft engine thus providing the ultimate generator source, it is often the case that the point of regulation 12 may be up to 30 metres removed from the active rectifier circuitry 11, which is typically closely associated with the generator source 10.

There can thus be a significant amount of source impedance between the active rectifier 11 and the point of regulation 12. While this traditional arrangement does allow for a relatively tight control at the point of regulation 12 for any disturbances caused by the loads, there is still a problem of disturbances associated with the active rectifier 11, as there can be a significant time delay associated with the voltage control detecting such disturbances at the point of regulation 12. This can be particularly significant for relatively noisier generator sources such as aircraft engines. There can thus be a significant latency between any disturbances associated with the generator 10, or indeed within the active rectifier circuitry 11 itself (e.g. transistor noise such as alpha strikes), reaching the point of regulation 12, and thus being compensated for by the point of regulation feedback control.

Figure 2:
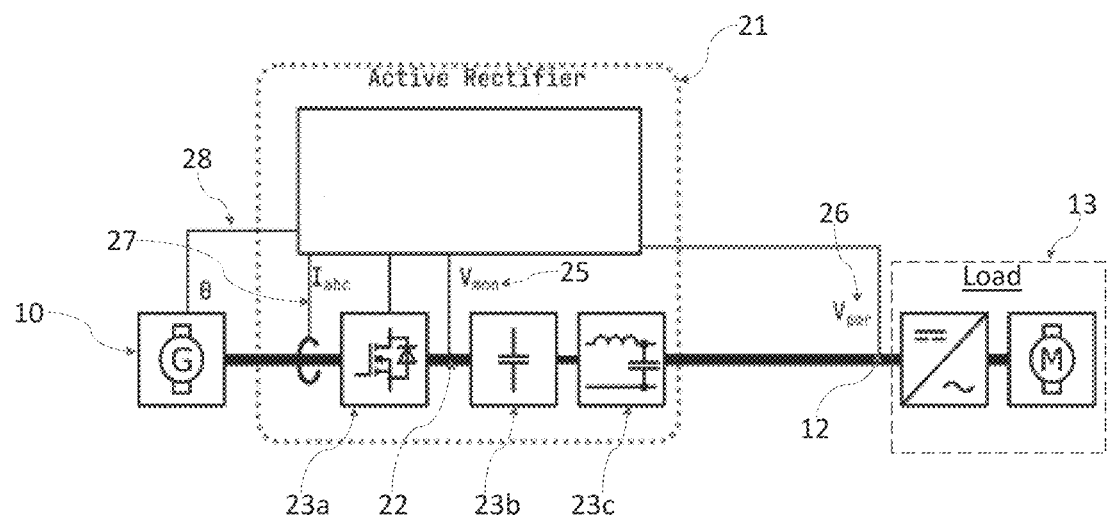
FIG. 2 shows a schematic of an active rectifier circuit according to an embodiment of the technology described herein.

The more traditional active rectifier circuit shown in FIG. 1 may therefore still provide relatively noisier outputs, especially where there is expected to be a significant amount of noise associated with the generator source 10. These problems can be mitigated using the technology described herein. FIG. 2 thus shows a schematic of an active rectifier circuit according to an embodiment of the technology described herein. As shown in FIG. 2, in addition to obtaining voltage feedback ('Vpor') 26 from a first point, i.e. the point of regulation 12, in a similar manner as described above, voltage feedback ('Vmon') 25 is also obtained from a second point 22 that is upstream of the point of regulation 12. For example, as shown in FIG. 2, the second point 22 is associated with the active rectifier circuit 21 itself. For instance, the second point may generally be obtained from a position that is between the switching circuit 23a of the active rectifier and the filtered output that is provided by the active rectifier. As shown in FIG. 2, it may be between a position between the switching circuit 23a of the active rectifier and the filtering stages 23b,23c of the active rectifier. That is, the second point may be directly downstream of the output of the switching circuit 23a. Various arrangements would be possible in this regard. As will be explained further below, the voltage feedback from both points is then suitably combined in order to try to maintain the desired voltage output at the point of regulation 12.

In FIG. 2 the active rectifier 21 also comprises various filtering circuitry and stages 23b, 23c. In general, any suitable circuitry may be provided in this regard and the active rectifier 21 may comprise any suitable circuitry or stages that an active rectifier may typically comprise. In this respect it will be noted that an active rectifier may already comprise a DC voltage bus sensor for monitoring purposes. In particular, the monitor provides supervisory protection local to the active rectifier in the event of acquisition issues or local failure. In some embodiments, this voltage may be used as feedback for control purposes. That is, the existing DC voltage bus sensor may be re-used to provide additional voltage feedback that is then provided as input to the active rectifier control. In some cases, however, there may be stricter regulatory requirements for such systems that mean that the control and monitoring functions must be functionally separated. In that case, an additional DC voltage bus sensor may be used to obtain additional voltage feedback for control that is separate to the DC voltage bus sensor provided for monitoring purposes. Various arrangements would be possible for dividing the control and monitoring requirements depending on the level of functional safety that is required.

Figure 3:
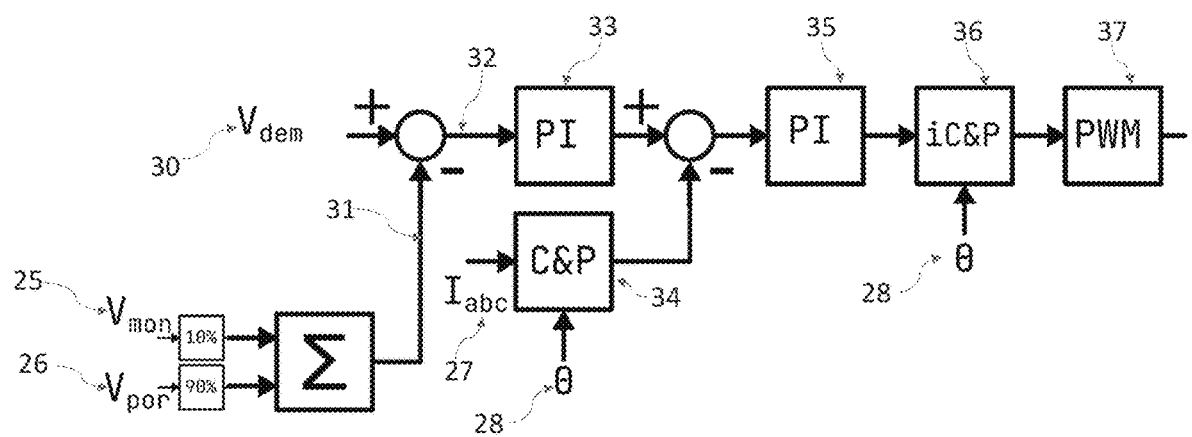
FIG. 3 and FIG. 4 show schematically two variations of active rectifier circuits according to embodiments of the technology described herein.

Subject to the particular requirements of the technology described herein, the active rectification can be implemented in any suitable manner, as desired. FIG. 3 shows a first example 3 in which the voltage feedback from the first point 26 ('Vpor') is directly combined with the voltage feedback from the second point 25 ('Vmon') at the input of the active rectifier and the combined voltage feedback 31 is then used for control, e.g. in the normal manner for regulation. This can be done in various suitable ways. In FIG. 3, the combined voltage feedback 31 is compared to the demanded voltage ('Vdem') 30 to generate an error signal 32 for a proportional-integral (PI) controller 33. As will be understood, a proportional-integral (PI) controller is a control loop mechanism employing feedback that is widely used in industrial control systems that continuously calculates an error value as the difference between a desired setpoint and a process variable and then applies a correction based on proportional and integral terms. The resulting signal is then compared with a measured current ('Iabc') and phase ('$\Theta$') and used to control suitable pulse width modulation circuitry. In this example Clarke and Park transforms 34 are applied to convert the three-phase current 27 and phase 28 into a two-phase rotating frame of reference system in a manner that is generally known in the art. However, other arrangements would be possible. As shown in FIG. 3, there is then a further proportional-integral (PI) controller 35, the output of which is then subject to the inverse Clarke and Park transform 36 to determine the output for the pulse width modulation (PWM) stage 37.

Figure 4:
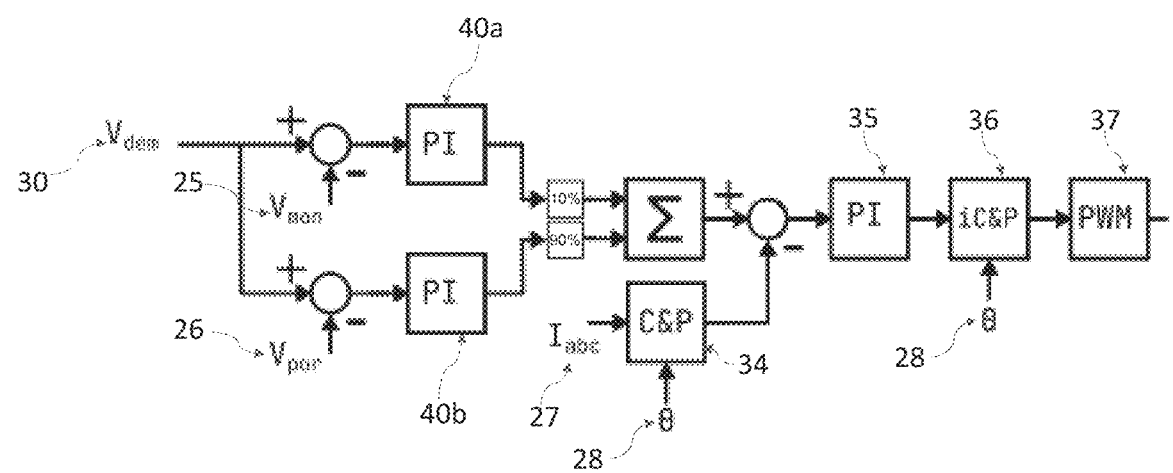

In FIG. 3, the voltage feedback from the first point 26 ('Vpor') and the voltage feedback from the second point 25 ('Vmon') are combined according to a weighted sum. FIG. 4 shows another example in which the voltage feedbacks from the first point 26 and the second point 25 each have their own proportional-integral (PI) controller 40a, 40b, with the respective outputs from the respective feedback loops then being combined, with suitable weighting, at that point, and then used for control. Various other arrangements would be possible in this regard for suitably combining the different voltage feedbacks to provide improved control in the manner of the technology described herein.

In general, the active rectification circuitry may be designed in any suitable manner. Typically, the active rectification circuitry includes one or more feedback loops. For example, in embodiments, the active rectifier may comprise one or more proportional controllers, such as proportional gain, or proportional-integral (PI) or proportional-integral-derivative (PID) controllers, as described above. However, various other arrangements would of course be possible, as desired. It will also be appreciated here that although the rectifying and control circuitry are described as separate stages it will be appreciated that these may share at least some circuitry or processing operations.

In the examples shown in FIGS. 3 and 4 the weighting is performed such that there is 90% contribution from the first point 26 ('Vpor') and 10% from the second point 25 ('Vmon'). Various other weightings may of course be used as desired. Typically, the weighting for the voltage feedback from the first point 26 ('Vpor') will be higher to ensure tighter point of regulation control but this is not necessary. The specific weighting may be determined during system architecting and system integration. It is also contemplated in embodiments that a dynamic weighting may be used. For example, depending on the operating conditions (e.g. the current operating stage or phase) of the aircraft, the weighting may be adjusted appropriately to reflect the expected level of noise associated with the engine. Thus, the control circuit may also take into account other conditions to increase the relative weighting from the second point 25 ('Vmon') when there is a known mechanical disturbance occurring (e.g. throttling) that means that the source noise is expected to be relatively more significant. Likewise, whilst in this example voltage feedback is only obtained from two points, it will be appreciated that additional voltage feedback could be obtained from a third or further point if that were desired.

Figure 5:
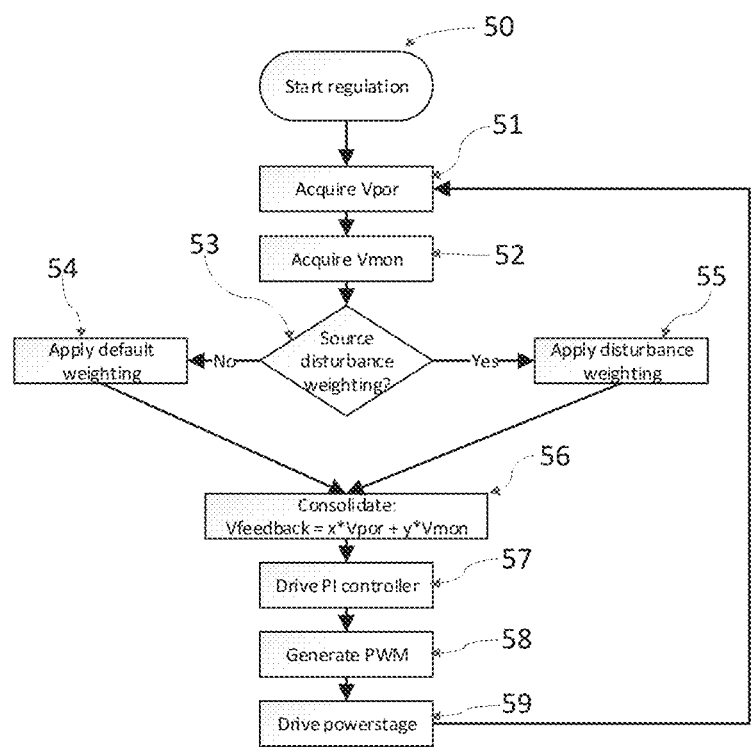
FIG. 5 is a flowchart corresponding to an embodiment of the technology described herein.

FIG. 5 is a flowchart corresponding to the overall operation of the active rectifier in the FIG. 3 embodiment described above. As shown in FIG. 5, when active voltage regulation is to be performed (step 50), the control circuitry is thus configured to obtain the voltages at the first point ('Vpor') (step 51) and at the second point ('Vmon') (step 52). Although shown as separate steps, it will be appreciated that these voltages may generally be obtained at the same time, in parallel.

In the example shown in FIG. 5, it is then determined, at step 53, whether or not a source disturbance is anticipated that means that the weighting should be adjusted accordingly. If there is an anticipated source disturbance, e.g. based on the current operating conditions of the overall system (step 53—yes), a certain 'disturbance weighting' can then be (and is) selected to be used (step 55), in which the voltage from the second point ('Vmon') is given greater weighting. Otherwise, if the operating conditions are relatively more stable (step 53—no), a default weighting is selected to be used (step 54). The voltage feedback from the two different points is then consolidated based on the selected weighting, at step 56, which is then used to drive the PI controller (step 57) to generate a suitable PWM signal i (step 58), as described above. The generated PWM signal is then used accordingly to drive a power stage of the active rectifier (step 59). As shown in FIG. 5, the method is repeated, e.g. such that there is a substantially continuous voltage regulation.

The technology described herein thus proposes a weighted voltage feedback to improve the response of the active rectifier, especially when the active rectifier is directly associated with a generator coupled to a thermal engine and the point of regulation is remote. This can provide smoother active rectification control.

The control circuitry may be implemented in any suitable manner, as desired. For example, this may be implemented either in hardware or software (including embedded software), as desired, using any suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

The methods in accordance with the technology described herein may thus be implemented at least partially using software e.g. embedded software. The controller may thus comprise a suitable microprocessor or microcontroller that is configured to execute software to perform the various operations described herein.

It will thus be seen that when viewed from further embodiments the technology described herein provides software specifically adapted to carry out the methods herein described when installed on a suitable data processor, a computer program element comprising software code portions for performing the methods herein described when the program element is run on a data processor, and a computer program comprising code adapted to perform all the steps of a method or of the methods herein described when the program is run on a data processing system.

Other arrangements would however be possible. For instance, the methods may also be implemented at least partially using appropriately dedicated hardware elements (processing circuitry) and/or programmable hardware elements (processing circuitry, e.g. such as a programmable FPGA (Field Programmable Gate Array)) that form part of the motor controller and can be programmed to operate in the desired manner. It would also be possible to implement the methods described above using analogue logic, for example.

Various other arrangements would of course be possible. Thus, although the present embodiments has been described with reference to various embodiments, it will be understood by those skilled in the art that various changes in form and detail may be made without departing from the scope of the embodiments as set forth in the accompanying claims.

The invention claimed is:

1. An active rectifier circuit for providing a rectified voltage output to a point of regulation that is located downstream of the active rectifier circuit, the active rectifier circuit comprising:
   active rectifying circuitry that converts an alternating current (AC) input into a direct current (DC) output and includes one or more switching elements; and
   control circuitry operable to control the one or more switching elements in the active rectifying circuitry based on voltage feedback to provide a certain voltage output at the point of regulation;
   wherein the control circuitry is configured to obtain voltage feedback from a first point associated with the point of regulation and to obtain parallel voltage feedback from a second, different point that is associated with the active rectifying circuitry, and to control the one or more switches in the active rectifying circuitry based on both the voltage feedback from the first point and the voltage feedback from the second point;
   wherein the voltage feedback from the first point and the voltage feedback from the second point are used together to control the active rectifying circuitry, wherein the control is performed using a weighted combination of the voltage feedback from the first point and the voltage feedback from the second point;
   wherein there is a set of weightings from which a particular weighting is selected to perform the weighted combination of the voltage feedback from the first point and the voltage feedback from the second point, and wherein the particular weighting is further selected based on a particular operating mode of a system to which the active rectifier circuit is connected.

2. The active rectifier circuit of claim 1, wherein the weighted combination of the voltage feedback from the first point and the voltage feedback from the second point can be dynamically adjusted according to one or more other conditions.

3. The active rectifier circuit of claim 1, wherein the voltage feedback from the first point and the voltage feedback from the second point are combined according to a weighted sum, which weighted sum is then compared to a demanded voltage output to generate an error signal, which error signal is then used to control the active rectifying circuitry.

4. The active rectifier circuit of claim 1, wherein the voltage feedback from the first point is compared to a demanded voltage output to generate a first error signal, and wherein the voltage feedback from the second point is compared to the demanded voltage output to generate a second error signal, and wherein the error signals are then combined according to a weighted sum, which weighted sum is then used to control the active rectifying circuitry.

5. The active rectifier circuit of claim 1, wherein the voltage feedback from the second point is also usable for safety monitoring of the active rectifier circuit.

6. The active rectifier circuit of claim 1, wherein voltage feedback is also obtained from a third point for use in safety monitoring of the active rectifier circuit, and wherein the voltage feedback from the first and second points that is used for control of the active rectifier circuit is separate from the voltage feedback from the third point that is used for safety monitoring.

7. An aircraft electrical distribution system comprising:
   a generator;
   an active rectifier circuit as claimed in claim 1; and
   an electrical distribution bus for distributing the rectified voltage output from the active rectifier circuit to one or more loads, and wherein the point of regulation is positioned on the electrical distribution bus upstream of the one or more loads.

8. A method of operating an active rectifier circuit to provide a rectified voltage output to a point of regulation that is located downstream of the active rectifier circuit, the active rectifier circuit comprising active rectifying circuitry that converts an alternating current (AC) input into a direct current (DC) output and includes one or more switching elements and control circuitry operable to control one or more switching elements in the active the rectifying circuitry based on voltage feedback to provide a certain voltage output at the point of regulation, the method comprising:
   obtaining by the control circuitry voltage feedback from a first point associated with the point of regulation and obtaining by the control circuitry parallel voltage feedback from a second, different point that is associated with the active rectifying circuitry; and
   controlling the active rectifying circuitry based on both the voltage feedback from the first point and the voltage feedback from the second point;
   using the voltage feedback from the first point and the voltage feedback from the second point together to control the active rectifying circuitry, wherein the control is performed using a weighted combination of the voltage feedback from the first point and the voltage feedback from the second point;
   dynamically adjusting the weighted combination of the voltage feedback from the first point and the voltage feedback from the second point according to one or more other feedback conditions; and
   wherein there is a set of weightings from which a particular weighting is selected to perform the weighted combination of the voltage feedback from the first point and the voltage feedback from the second point, and wherein the method further comprises selecting the particular weighting based on a particular operating mode of a system to which the active rectifier circuit is connected.

9. The method of claim 8, further comprising:
   combining the voltage feedback from the first point and the voltage feedback from the second point according to a weighted sum, and comparing the weighted sum to a demanded voltage output to generate an error signal, which error signal is then used to control the active rectifying circuitry.

10. The method of claim 8, further comprising:
comparing the voltage feedback from the first point is compared to a demanded voltage output to generate a first error signal, comparing the voltage feedback from the second point to the demanded voltage output to generate a second error signal, and combining the error signals according to a weighted sum, which weighted sum is then used to control the active rectifying circuitry.

11. The method of claim 8, further comprising:
obtaining separate voltage feedback from a third point for safety monitoring the active rectifier circuit.

12. A non-transitory computer program product comprising instructions that when executed by a processor will cause the processor to perform a method as claimed in claim 8.

13. The active rectifier circuit of claim 1, wherein the first point is located downstream of the active rectification circuitry, between the active rectification circuitry and one or more loads;
wherein the second point is located along an electrical bus that is internal to the active rectifier circuit, and downstream of the active rectifying circuitry of the active rectifier, but prior to a final output from the active rectifier.

14. The method of claim 8, wherein the first point is located downstream of the active rectification circuitry, between the active rectification circuitry and one or more loads;
wherein the second point is located along an electrical bus that is internal to the active rectifier circuit, and downstream of the active rectifying circuitry of the active rectifier, but prior to a final output from the active rectifier.

* * * * *